United States Patent Office 3,383,358
Patented May 14, 1968

3,383,358
PROCESS OF PRODUCING POLYOXAZOLI-
DINONE RESINS
Charles H. Schramm, Easton, Pa., assignor to J. T. Baker
Chemical Company, Phillipsburg, N.J., a corporation
of New Jersey
No Drawing. Filed Aug. 16, 1965, Ser. No. 480,183
5 Claims. (Cl. 260—47)

ABSTRACT OF THE DISCLOSURE

A process of producing a thermoplastic polyoxazolidinone resin which comprises dehydrohalogenating at a temperature of 5° C. to 150° C. a poly(beta-haloalkylurethano) resin prepared by reacting a polyisocyanate with a poly(halohydrin) in quantities providing one halohydrin group per isocyanate group. The resins are useful in preparing castings and for use as sealants and coatings.

---

This invention relates to novel polyoxazolidinone derivatives and to a method for their preparation. More particularly, this invention relates to poly(2-oxazolidinone) resins and to methods and intermediates for their preparation. The intermediates are more fully set forth in application Serial No. 480,134 filed concurrently herewith.

It is an object of the present invention to provide a method for producing polyoxazolidinone derivatives.

It is another object of this invention to proivde novel polyoxazolidinone resins.

It is another object of this invention to provide resins uniquely adapted for many of the same applications as polyurethane resins.

Other objects and advantages of the present invention will become apparent to one skilled in the art from the accompanying description and disclosure.

Accordingly, one or more of the objects of the present invention can be accomplished by a process which comprises subjecting a poly(beta-haloalkylurethano) resin to dehydrohalogenation conditions to produce a polyoxazolidinone resin.

Poly(beta-haloalkylurethano) resins can be prepared by the reaction of a polyisocyanate with a poly(halohydrin) in quantities providing about one halohydrin group per isocyanato group.

The term "polyisocyanate" refers to compounds containing two or more isocyanato (—NCO) groups.

The term "poly(halohydrin)" refers to compounds containing two or more halohydrin

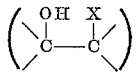

groups, wherein X is halogen.

The term "beta-haloalkylurethano" refers to the

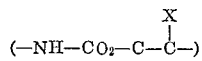

radical.

The term "epoxide" or "epoxy" refers to the oxirane group

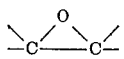

The term "2-oxazolidinone" refers to the structure:

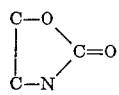

The term "residue" in reference to organic polyisocyanates refers to the organic portion of an isocyanate compound exclusive of the reactive isocyanate groups. The term "residue" in reference to polyols refers to the organic portion of a polyol exclusive of the hydroxyl groups. The term "residue" in reference to a poly(halohydrin) refers to the organic portion of a poly(halohydrin) exclusive of the halohydrin (e.g. $ClCH_2$—CHOH—) groups.

Illustrative of the above described process is the interaction of equal molar quantities of hexamethylene diisocyanate with 1,4-dichloro-2,3-butanediol to produce a poly(beta-haloalkylurethano) resin followed by dehydrochlorination to produce the polyoxazolidinone as shown below:

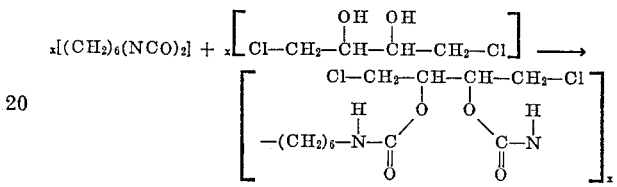

Dehydrohalogenation of the above poly(halourethane) gives a polyoxazolidinone as represented below:

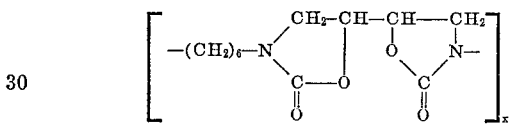

wherein $x$ represents repeating units of said formula.

Among the preferred epoxyoxazolidinone derivatives are those which correspond to the structure:

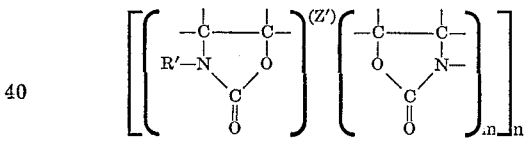

wherein R' is a polyvalent organic radical selected from aliphatic and aromatic structures such as alkylene, substituted alkylene, alkyleneoxy, alkenylene, substituted alkenylene, arylene, substituted arylene, and the like; Z' is a polyvalent organic radical selected from aliphatic and aromatic structures such as alkylene, substituted alkylene, alkyleneoxy, cycloalkylene, substituted cycloalkylene, arylene, substituted arylene, aryleneoxy, aralkylene, substituted aralkylene, and the like, and Z' can also be zero, i.e., Z' can be a covalent bond directly connecting an oxazolidinone group with another oxazolidinone group; the letter $m$ represents a whole number of from 1 to 4, and $n$ is an integer representing the number of repeating groups of said formula. Illustratively, when equal molar quantities of a dichlorohydrin, such as that formed by reacting 2 moles of epichlorohydrin with one mole of isopropylidene bis(-4-hydroxyphenyl), are reacted with a diisocyanate, e.g. toluene diisocyanate, the resin has the following recurring groups after being dehydrohalogenated.

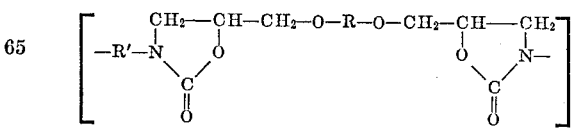

wherein R' represents the organic residue of the diisocyanate; and R represents the organic residue of the dihydroxyphenyl compound.

In addition to carbon, hydrogen, oxygen, sulfur, nitrogen, and halogen atoms, the resins described in the present invention can contain silicon, titanium, phosphorus, and the like.

Polyisocyanate reactants suitable for use in the production of the present invention oxazolidinones include isocyanato compounds and prepolymers which are being developed for commercially important polyurethane chemistry. Among the preferred polyisocyanates are those corresponding to the formula $R(NCG)_x$ wherein G is oxygen or sulfur, $x$ is an integer of two or more and particularly two, and R is an alkylene, substituted alkylene, arylene or substituted arylene radical, a hydrocarbon or substituted hydrocarbon containing one or more aryl —NCG bonds and one or more alkyl —NCG bonds. R can also include radicals such as —RZR— where Z can be a divalent moiety such as —O—, —O—R—O, —CO—, —CO$_2$—, —S—, —S—R—S—, —SO$_2$—, and the like. Examples of such compounds include hexamethylene diisocyanate, xylylene diisocyanates, $$(OCNCH_2CH_2CH_2OCH_2)_2$$

1-methyl-2,4-diisocyanatocyclohexane, phenylene diisocyanates, tolylene diisocyanates, chlorophenylene diisocyanates, polyhalophenylene diisocyanates, diphenylmethane-4,4'-diisocyanate, naphthalene-1,5-diisocyanate, triphenylmethane-4,4',4''-triisocyanate, xylene-α,α'-diisothiocyanate, and isopropylbenzene-α,4-diisocyanate.

Further included are dimers and trimers of isocyanates and diisocyanates and polymeric diisocyanates of the general formula $(RNCG)_x$ and $[R(NCG)_x]_y$ in which $x$ and $y$ are two or more, as well as compounds of the general formula $M(NCG)_x$ in which $x$ is two or more and M is a monofunctional or polyfunctional atom or group. Examples of this type include ethylphosphonic diisocyanate, $C_2H_5P(O)(NCO)_2$; phenylphosphonic diisocyanate, $C_6H_5P(NCO)_2$; compounds containing a ≡Si-NCG group, isocyanates derived from sulfonamides, $R(SO_2NCO)_x$, and the like.

A particularly useful mixture of polyisocyanates are the products obtainable by phosgenation of the reaction products of aniline and formaldehyde as expressed by the following general formula:

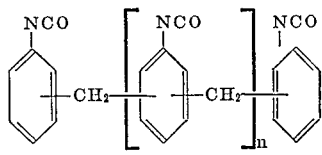

wherein $n=0$ to 10.

Poly(halohydrin) reactants suitable for preparing the poly(halourethanes) are essentially unlimited, and the particular poly(halohydrin) selected will depend on cost, availability, reactivity, the properties of the product sought to be produced, and other practical and theoretical considerations.

The preferred poly(halohydrin) reactants will generally correspond to the structure:

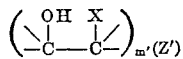

wherein $m'$ is an integer between 2 and 5, and X represents a halogen. The value for $m$ is preferably two. X is preferably chlorine or bromine, and Z' represents a halohydrin having from 2 to 5 halohydrin groups.

Poly(halohydrin) compounds are readily produced by hydrohalogenation of the corresponding polyepoxide compounds. For example, treatment of divinylbenzene dioxide with hydrogen chloride yields the corresponding poly(halohydrin) structure:

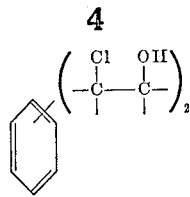

Useful poly(halohydrin) compounds include 1,4-dichlorobutanediol-2,3, 1,4-dibromobutanediol-2,3, 2,3-dichlorobutanediol-1,4, 2,3-dibromobutanediol-1,4, vinylcyclohexene, dichlorohydrin, 3,3'-dichloro-2,2'-dihydroxydipropylether, epichlorohydrin adducts of polyols and polyhydric phenols including 1,2-ethylenedioxy-bis-(3-chloro-2-propanol), 1,4-butylenedioxy-bis(3-chloro-2-propanol), and the like, and the corresponding adducts of resorcinol, glycerol, pentaerythritol, sorbitol, poly(vinyl alcohol), and other such polyhydric compounds.

Other useful poly(halohydrin) compounds are the halohydrin compounds which correspond to polyepoxides (wherein each oxirane group is instead a halohydrin group) such as aliphatic polyol epoxycyclohexanecarboxylates exemplified by compounds which include 3-methyl-1,5-pentanediol bis(3,4-epoxycyclohexanecarboxylate),
1,5-pentanediol bis(3,4-epoxycyclohexanecarboxylate),
2-methoxymethyl-2,4-dimethyl-1,5-pentanediol bis-(3,4-epoxycyclohexanecarboxylate),
ethylene glycol bis(3,4-epoxycyclohexanecarboxylate),
2,2-diethyl-1,3-propanediol bis(3,4-epoxycyclohexanecarboxylate),
1,6-hexanediol bis(3,4-epoxycyclohexanecarboxylate),
2-butene-1,4-diol bis(3,4-epoxycyclohexanecarboxylate),
2-butene-1,4-diol bis(3,4-epoxy-6-methylcyclohexanecarboxylate),
1,1,1-trimethylolpropane tris(3,4-epoxycyclohexanecarboxylate),
1,2,3-propanetriol tris(3,4-epoxycyclohexanecarboxylate);

oxyalkylene glycol epoxycyclohexanecarboxylates exemplified by compounds which include dipropylene glycol bis(2-ethylhexyl 4,5-epoxycyclohexane-1,2-dicarboxylate),
diethylene glycol bis(3,4-epoxy-6-methylcyclohexanecarboxylate),
triethylene glycol bis(3,4-epoxycyclohexanecarboxylate);

epoxycyclohexylalkyl epoxycyclohexanecarboxylates exemplified by compounds which include 3,4-epoxycyclohexylmethyl 3,4-epoxycyclohexanecarboxylate,
3,4-epoxy-1-methylcyclohexylmethyl 3,4-epoxy-1-methyl cyclohexanecarboxylate,
3,4-epoxy-2-methylcyclohexylmethyl 3,4-epoxy-2-methyl-cyclohexanecarboxylate,
(1-chloro-3,4-epoxycyclohexan-1-yl)methyl 1-chloro-3,4-epoxycyclohexanecarboxylate,
(1-bromo-3,4-epoxycyclohexan-1-yl)methyl 1-bromo-3,4-epoxycyclohexanecarboxylate,
(1-chloro-2-methyl-4,5-epoxycyclohexan-1-yl)methyl 1-chloro-2-methyl-4,5-epoxycyclohexanecarboxylate;

epoxycyclohexylalkyl dicarboxylates exemplified by compounds which include bis(3,4-epoxycyclohexylmethyl)pimelate,
bis(3,4-epoxy-6-methylcyclohexylmethyl) maleate,
bis(3,4-epoxy-6-methylcyclohexylmethyl) succinate,
bis(3,4-epoxy-6-methylcyclohexylmethyl) oxalate,
bis(3,4-epoxy-6-methylcyclohexylmethyl) sebacate,
bis(3,4-epoxy-6-methylcyclohexylmethyl) adipate;

epoxycyclohexylalkyl phenylenedi-carboxylates exemplified by compounds which include bis(3,4-epoxycyclohexylmethyl) terephthalate,
bis(3,4-epoxy-6-methylcyclohexylmethyl) terephthalate;

epoxycyclohexylalkyl oxyalkylene glycol ethers exemplified by compounds which include bis(3,4-epoxy-6-methylcyclohexylmethyl) diethylene glycol ether;

sulfonyldialkanol bis(epoxycyclohexanecarboxylates) exemplified by compounds which include 2,2'-sulfonyldiethanol bis(3,4-epoxycyclohexanecarboxylate);

epoxycyclohexane-1,2-dicarboximides exemplified by compounds which include

N,N'-ethylene bis(4,5-epoxycyclohexane-1,2-dicarboximide);

epoxycyclohexylalkyl carbamates exemplified by compounds which include di(3,4-epoxycyclohexylmethyl) 1,3-tolylenedicarbamate;

epoxycyclohexylalkyl acetals exemplified by compounds which include bis(3,4-epoxy-6-methylcyclohexylmethyl)3,4-epoxy-6-methylcyclohexanecarboxaldehyde acetal;

epoxycyclohexyl-substituted spirobi(metadioxane) derivatives exemplified by compounds which include 3,9-bis(3,4-epoxycyclohexyl)spirobi(metadioxane) and the diglycidyl ether of poly(oxyalkylene) glycols such as those of poly(oxyethylene) glycol, poly(oxypropylene) glycol, and poly(oxybutylene) glycols, preferably such glycols have molecular weights of from about 100 to about 3,000 and particularly from about 150 to 1,000. Other poly(halohydrin) compounds can be employed which correspond to polyepoxide derivatives such as 3,4-epoxy-6-methylcyclohexylmethyl 9,10 - epoxy-stearate, 1,2 - bis(2,3-epoxy-2-methylpropoxy)ethane, the diglycidyl ether of 2,2-(p-hydroxyphenyl)propane, butadiene dioxide, dicyclopentadiene dioxide, pentaerythritol tetrakis(3,4-epoxycyclohexanecarboxylate), divinylbenzene dioxide, and the like.

The useful poly(halohydrin) reactants also include those prepared by halohydrination of polyunsaturated compounds which contain two or more olefinically unsaturated groups reactive to hypohalite addition reactions. The poly(halohydrins) employed will generally have molecular weights of less than about 3,000 and preferably less than about 1,000.

The dehydrohalogenation reaction producing polyoxazolidinones is readily accomplished by treating poly(beta-haloalkylurethano) resin with an inorganic or organic acid acceptor such as alkali metal hydroxides and carbonates, ion exchange resins, pyridine, amines, and the like. For example, the dehydrohalogenation can be accomplished by heating the poly(beta-haloalkylurethano) resin with aqueous potassium hydroxide at a temperature between 5° C. and 150° C. for a period from about five minutes to about four hours or by heating the product mixture with pyridine either in aqueous medium or an organic solvent medium. Any solvent medium can be employed which is inert to the reactants and has the proper solubility characteristics. Suitable solvents include hydrocarbons such as benzene, xylene, toluene, hexane, heptane, octane, cyclohexane and the like; oxygenated solvents such as acetone, methylisobutylketone, cyclohexanone, ethyl acetate, dioxane, tetrahydrofuran, dibutyl ether, and the like; and other common solvents such as carbon tetrachloride, carbon disulfide, methylene chloride, dimethylformamide and the like. The polyoxazolidinone can be recovered from the reaction medium by conventional techniques such as by filtration, distillation, and combinations of these techniques.

The polyoxazolidinones of this invention are thermoplastic materials which can be processed by standard thermoplastic techniques to prepare flexible products. Illustratively, the polyoxazolidinones of this invention can be processed by conventional thermoplastic extrusion or injection molding techniques. Additionally, the polyoxazolidinones of this invention can be used: for preparing castings; as sealants or coatings; and for many of the same applications as polyurethane resins.

The following examples are illustrative of the invention:

EXAMPLE 1

A dichlorohydrin (mol. wt. 203) was prepared from two moles of epichlorohydrin and one mole of water in the presence of $BF_3$. Thirty-five grams (0.172 M) of this dichlorohydrin was dissolved in 50 ml. of dimethylformamide. Tolylene diisocyanate (29.9 g., 0.172 M) was added at room temperature; an immediate exotherm raised temperature to 70° C. After the exotherm subsided, the reaction was heated to 100° C. for one hour. At the end of this period free isocyanate had disappeared. A 5 ml. aliquot of this poly(beta-halourethano)resin was cooled to room temperature, and was then poured with stirring into a large excess of ice-water. The precipitate that separated out was filtered off, dried overnight in vacuo. The product softened at 98–108° C.; $N=7.60$; $Cl=17.98$; theory for the poly(chlorourethano)resin $N=7.43$; $Cl=18.8$. The solution of poly-chlorouretane) was diluted with 50 ml. dimethylformamide, then 50% sodium hydroxide solution containing 13.6 g. NaOH was added. After original exotherm subsided, the mixture was heated to 90° C. for 3 hrs. The cooled mixture was poured with stirring into ice-water. A white solid polyoxazolidinone softening at 132–150° C. was obtained; $N=9.59$; $Cl=4.98$; theory, $N=9.2$; $Cl=0$.

EXAMPLE 2

A dichlorohydrin was prepared by condensing 1 mole polypropylene glycol 410 with 2.1 moles epichlorohydrin in the presence of $BF_3$ etherate. 0.1 M (62.2 g.) of this dichlorohydrin was dissolved in 82 ml. ethylene dichloride. 0.1 M (17.4 g.) of tolylene diisocyanate (80% 2,4; 20% 2,6) was added together with 0.1 ml. stannous octoate to prepare the poly(beta-halourethano) resin. After standing overnight at room temperature, the reaction mixture was dehydrohalogenated with 8.8 g. of sodium hydroxide at 65° C. for 2.5 hrs. After cooling and neutralization with carbon dioxide, the mixture was filtered, concentrated in vacuo. A thick gum of polyoxalidinone was isolated: found $N=3.15\%$; theory $N=3.8$.

EXAMPLE 3

A dichlorohydrin was prepared from polyethylene glycol 200 (1 M) and epichlorohydrin (2 M). Condensation with tolylene diisocyanate followed by dehydrohalogenation as in Example 2 yielded a tacky gum of polyoxazolidinone.

EXAMPLE 4

A dichlorohydrin was prepared from diethylene glycol (1 M) and epichlorohydrin (2 M). The dichlorohydrin (0.1 M, 29.5 g.) was mixed with tolylene diisocyanate (0.1 M) in dimethylformamide-toluene solution at 90° C. for one hour to prepare the poly(beta-halourethano) resin. Sodium hydroxide (8.0 g.) was added at 50° C., reaction was heated at 100° C. for 2 hrs., cooled, poured with stirring into ice-water. The gummy precipitate was filtered off, dissolved in dimethylformamide. The solution was again poured into water. The precipitate was collected, dried in vacuo at 50° C. The product polyoxazolidinone softened at 60–65° C.; found $N=7.02\%$; theory 7.09%; found, $Cl=5.7$; theory 0.00.

Heating the polyoxazolidinone under pressure for 5 minutes at 180° F. afforded a clear disc.

EXAMPLE 5

A. Preparation of dichlorohydrin from Dow Epoxy Resin (DER) 332 (a pure form of the diglycidyl ether of isopropylidene bis(4-hydroxyphenyl))

To 298 g. of concentrated HCl in a beaker cooled to

5° C. was added, dropwise with stirring, a solution of 341 g. DER–332 dissolved in 341 g. of methylene chloride. The reaction temperature was allowed to reach 20° C. The organic layer was then washed with distilled water until free acid was removed. The organic layer was dried over sodium sulfate, then concentrated in vacuo. The product was dissolved in methylene chloride to prepare a 50% solution.

B. Reaction of DER–332 dichlorohydrin with hexamethylene diisocyanate

To 82.6 g. of 50% solution about (0.1 M dichlorohydrin) was added 16.8 g. (0.1 M) hexamethylene diisocyanate. Methylene chloride (50 ml.) was added to mixture. Free isocyanate was found to be 0.059 g./ml. (theory 0.054). After the addition of 0.2 ml. stannous octoate, the reaction mixture was heated to 40° C. for one hour. Free isocyanate was then found to be 0.0002 g./ml. (greater than 99% reaction).

The reaction mixture was poured into an excess of methyl alcohol. The precipitate was filtered off, dried in vacuo; melting point 250–255° C. (softening at 225°). Analysis of this poly(chlorourethane):

Theory: N, 4.81; chlorine, 12.20. Found: N, 4.78; chlorine, 12.08. Molecular weight—(581)$x$.

C. Dehydrohalogenation of above poly(chlorourethane)

To 58.1 g. of the poly(chlorourethane) and 500 ml. of dimethylformamide at 60° C. was added 16 g. of a 50% sodium hydroxide solution. Dehydrohalogenation was carried out at 100° C. for 2 hrs. The reaction mixture was allowed to cool, was then poured into an excess of methyl alcohol. The precipitate was removed, washed exhaustively with water in a Waring Blendor, then dried in vacuo. This polyoxazolidone softened at 289° C., decomposed at 310° C.

*Analysis.*—Theory: N, 5.51; chlorine, 0. Found: N, 5.80; chlorine, 3.1. Molecular weight—(508)$x$.

In the dehydrohalogenation step 75% of original chlorine has been eliminated.

D. Reaction of DER–332 dichlorohydrin with diphenylmethane diisocyanate

To 82.6 g. of 50% solution of the dichlorohydrin in methylene chloride (0.1 M dichlorohydrin) was added 24.0 g. (0.1 M) of diphenylmethane diisocyanate and 50 ml. of methylene chloride. After the addition of 0.2 ml. stannous octoate, the reaction mixture was heated to 40° C. for one hour. Free isocyanate was then found to be <0.001 g./ml. The reaction mixture was cooled, poured into an excess of methyl alcohol. After drying, the product did not melt below 320° C. Analysis for poly(chlorourethane):

Theory: N, 4.22; chlorine, 10.71. Found: N, 4.14; chlorine, 11.21. Molecular weight—(663)$x$.

E. Dehydrohalogenation of above poly(chlorourethane)

To 66.3 g. of the poly(chlorourethane) and 500 ml. of dimethylformamide at 60° C. was added 16 g. of a 50% sodium hydroxide solution. Dehydrohalogenation was carried out at 100° C. for 2 hours. The reaction mixture was cooled, poured into an excess of methyl alcohol. The precipitate was washed with water in a Waring Blendor, then dried in vacuo. The polyoxazolidone obtained melted at 158–173° C.

*Analysis.*—Theory: N, 4.74; chlorine, 0. Found: N, 5.20; chlorine, trace. Molecular weight (theory)—(590)$x$.

Dehydrohalogenation of the polychlorourethane prepared from diphenylmethane diisocyanate proceeded to completion, whereas with hexamethylene diisocyanate 25% of original chlorine was not removed. Complete dehydrohalogenation with diphenylmethane diisocyanate may be connected with the solubility of the resulting polyoxazolidone (soluble in dimethylformamide). The polyoxazolidone from the hexamethylene diisocyanate experiment was insoluble in hot dimethylformamide and all other organic solvents.

What is claimed is:

1. A process of producing a thermoplastic polyoxazolidinone resin which comprises dehydrohalogenating at a temperature of 5° C. to 150° C. a poly(beta-haloalkylurethano) resin prepared by reacting a polyisocyanate with a poly(halohydrin) in quantities providing one halohydrin group per isocyanate group.

2. A process of claim 1 wherein the poly(halohydrin) is a di(halohydrin) and the polyisocyanate is a diisocyanate.

3. A process of claim 2 wherein the diisocyanate is tolylene diisocyanate and the di(halohydrin) is poly(epichlorohydrin).

4. A process of claim 2 wherein the diisocyanate is tolylene diisocyanate and the di(halohydrin) is isopropylidene bis[1-(p-phenyleneoxy)-3-chloro-2-propanol].

5. A process of claim 2 wherein the diisocyanate is tolylene diisocyanate and the dihalohydrin is the reaction product of a poly(oxyalkylene)glycol and epichlorohydrin.

References Cited
UNITED STATES PATENTS 3,020,262  2/1962  Speranza _____ 260—47
3,278,460  10/1966  Auerbach et al. _____ 260—2

WILLIAM H. SHORT, *Primary Examiner.*

L. LEE, *Assistant Examiner.*